(12) United States Patent
Ling et al.

(10) Patent No.: US 12,135,208 B2
(45) Date of Patent: Nov. 5, 2024

(54) LARGE GEAR INVOLUTE ARTIFACT ASSEMBLED WITH MANDREL

(71) Applicant: DALIAN UNIVERSITY OF TECHNOLOGY, Liaoning (CN)

(72) Inventors: Siying Ling, Liaoning (CN); Ming Ling, Liaoning (CN); Zhaoyao Shi, Liaoning (CN); Hongxia Song, Liaoning (CN); Zhihao Zhang, Liaoning (CN); Xiangsheng Liu, Liaoning (CN); Liding Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/792,236

(22) PCT Filed: Sep. 26, 2021

(86) PCT No.: PCT/CN2021/120627
§ 371 (c)(1),
(2) Date: Jul. 12, 2022

(87) PCT Pub. No.: WO2023/044850
PCT Pub. Date: Mar. 30, 2023

(65) Prior Publication Data
US 2023/0358522 A1    Nov. 9, 2023

(51) Int. Cl.
*G01B 3/14* (2006.01)
*G01B 5/20* (2006.01)

(52) U.S. Cl.
CPC ............... *G01B 3/14* (2013.01); *G01B 5/202* (2013.01)

(58) Field of Classification Search
CPC ............. G01B 5/202; G01B 3/14; G01B 3/50
(Continued)

(56) References Cited

U.S. PATENT DOCUMENTS 2,697,283 A * 12/1954 Leuthold .................. G01B 5/20
                                                                33/501.14
4,285,133 A *  8/1981 Sterki .................... G01B 7/283
                                                                  33/1 M (Continued)

*Primary Examiner* — George B Bennett
(74) *Attorney, Agent, or Firm* — MUNCY, GEISSLER, OLDS & LOWE, P.C.

(57) ABSTRACT

A large gear involute artifact assembled with mandrel used as physical datum of precision traceability and measurement transmission for large gear involute is proposed. The artifact comprises a large gear involute artifact stripe, a mandrel, a backing plate, a counterweight shaft, an adjustable counterweight ring, the adjustable screws of counterweight, the connecting screws for backing plate, the connecting screws for artifact and an eccentric multi-ball bearing. The structure and the rolled length of the large gear involute artifact assembled with mandrel fit the basic requirements of class-1 accuracy in the national standard of gear involute artifact GB/T 6467-2010 in China. It has advantages of long rolled length, adjustable center of mass, uniform datum, compact structure, and portability. It adopts lightweight design, which can be installed and transported by one person manually, and is suitable for the structural design of large gear involute artifact with base-circle diameter greater than 500 mm.

10 Claims, 2 Drawing Sheets

(58) Field of Classification Search
USPC .......................... 33/501.12, 501.14, 501.16
See application file for complete search history.

(56) References Cited

U.S. PATENT DOCUMENTS

| | | | | |
|---|---|---|---|---|
| 4,488,359 A * | 12/1984 | Misson | ............... | G01M 13/021 |
| | | | | 33/501.8 |
| 5,083,458 A * | 1/1992 | DeGeorge | .............. | H04N 5/772 |
| | | | | 356/392 |
| 5,271,271 A * | 12/1993 | Frazier | ................ | G01M 13/021 |
| | | | | 33/501.16 |
| 6,874,241 B2 * | 4/2005 | Och | ........................ | G01B 5/202 |
| | | | | 33/501.16 |
| 8,991,246 B2 * | 3/2015 | Hirono | ................ | B23F 23/1218 |
| | | | | 73/104 |
| 2007/0186711 A1 * | 8/2007 | Oberle | .................. | F16F 15/265 |
| | | | | 74/460 |
| 2020/0309519 A1 * | 10/2020 | Ling | .................... | G01B 21/042 |

* cited by examiner

LARGE GEAR INVOLUTE ARTIFACT ASSEMBLED WITH MANDREL

FIELD OF THE INVENTION

The present invention belongs to precision gear machining and measuring technical field, which involves a large gear involute artifact assembled with mandrel and is used as physical datum of precision traceability and measurement transmission for large gear involute.

BACKGROUND

The involute profile is currently the most widely used and most mature tooth profile. Gears with large involute profile generally refer to gears with tip circle diameter greater than 500 mm, which are commonly used in the field of wind power, nuclear power, rubber and plastic machinery, large construction machinery, marine resource exploration equipment, large ships and so on. The high-end equipment has more higher requirements for the machining accuracy and then the accuracy of measuring instruments for large gears. The gear involute artifacts are standard measuring tools to calibrate all kinds of involute measuring tools, which are used to transmit the gear involute parameter value, correct the instrument indication and determinate the instrument indication error. At present, the research of large gear involute artifact is blank in the world.

In the field of the large gear artifact: in year 2009, Federal German Physical Technology Research (PTB) manufacture a sector large gear artifact with tip diameter about 1000 mm, rolled length of the involute about 120 mm and the gear profile form deviation about 1.8 μm, which is the gear artifact with the largest involute rolled length reported publicly. In year 2011, PTB design and manufacture a lager ring gear standard artifact with tip diameter about 2000 mm, rolled length of involute about 84 mm, and the gear profile form deviation about 2 μm, which is the gear artifact with largest base diameter reported publicly.

The National Metrology Institute of China has also developed a multi-parameter standard artifact (CN202010124770.2) with tip diameter about 1000 mm, however its manufacturing accuracy only between Class-4 and Class-2. The above-mentioned gear standard artifacts with weight between 0.5 t and 2 t, which are inconvenient to convey. Additionally, since such gear artifacts are designed to international standard of cylindrical gears ISO1328-1: 2013(E) which are integrated gear involute artifact, gear helix artifact and gear pitch artifact, while the rolled length of such large gear artifacts is short relative to diameter parameter, and can not meet the basic requirements of rolled length of gear involute artifact according to national standard of gear involute artifact GB/T 6467-2010 in China.

The high-precision gear research laboratory of Dalian university of technology has developed Class-1 accuracy gear involute artifact with base circle radius diameter $r_b$ equal to 100 mm, rolled length of involute about 60~70 mm and tooth profile form deviation less than 0.5 μm, which meet the requirements of tolerance and rolled length of gear involute artifact with Class-1 accuracy in China. However, the gear involute artifact with a larger rolled length is not involved. The patent (CN 201610847011.2) opened a kind structure of large gear involute artifact, wherein the large gear involute artifact integrated involute artifact piece and sector base piece. However, it does not have direct base circle center, so there is a certain error in the center of the base circle determined by the arc on the sector base piece, which reduces the performance of this type of large gear involute artifact, and there is no such type of gear involute artifact product on the market. The patent (CN 201711393983. X) opened gear involute artifact with self-assembly datum and equal common normal, however, the structure of gear involute artifact fit gear involute artifact with small and medium base parameters, but does not fit large gear involute artifact with lightweight. Otherwise, there are no relevant documents on gear involute artifacts with tip diameter more than 500 mm and meeting the Class-1 and Class-2 accuracy according to national standard of gear involute artifact in China.

SUMMARY

In order to solve the problem of structural design of large gear involute artifact according to national standard of gear involute artifact GB/T 6467-2010 in China, the invention opened a lightweight large gear involute artifact assembled with mandrel.

The specific technical solutions are that a large gear involute artifact assembled with mandrel comprises a large gear involute artifact stripe, a mandrel, a backing plate, a counterweight shaft, an adjustable counterweight ring, the setting screws for adjustable counterweight, the connecting screws for backing plate, the connecting screws for artifact and an eccentric multi-ball bearing.

The large gear involute artifact stripe is of integrated and symmetrical structure, one end has an artifact tooth, the other end has the connecter, the radial datum shaft and the locking screw of artifact stripe for assembly, positioning and locking the artifact stripe, and the middle of artifact stripe is connected with the support arm with the slot for reducing weight and the holes for reducing weight. Artifact tooth comprise a left flank of gear involute artifact and a right flank of gear involute artifact, which are axial symmetry along with the radial datum shaft of artifact stripe. The face width of artifact tooth is not smaller than 6 mm, the rolled length of the involute is not smaller than the recommended value in national standard of gear involute artifact GB/T 6467-2010 in China, and the designed gear profile is given form the base circle. Two ends of the large gear involute artifact stripe have center holes, which is convenient for machining the mounting surface of the connecter, the radial datum shaft and the locking screw of the large gear involute artifact stripe. The large gear involute artifact stripe multiple fixedly connected to the mandrel with the backing plate, the counterweight shaft, the connecting screws for backing plate and the connecting screws for artifact to ensure the rigidity and stability of the connection between the large gear involute artifact strip and the mandrel.

The mandrel is the machining and measurement datum shaft for the large gear involute artifact, which is of symmetrical structure at both ends. The two parallel flat grooves in the connecting shaft section of the mandrel are machined symmetrically relative to the mandrel axis, and the height of the flat grooves of mandrel is a little higher than that of the connecting plate and the backing plate, to limit rotational freedom of the large gear involute artifact stripe and the backing plate relative to the mandrel after assembly. The middle of flat grooves of mandrel has a datum inner hole whose centerline is orthogonal to mandrel axis, and used as the assembly datum of the large gear involute artifact stripe as well as the flat grooves of mandrel of surface. The flat grooves of mandrel have the close-packed locking screw holes of artifact stripe for connecting with the large gear involute artifact stripe and the backing plate. From the connecting shaft section of mandrel to the two ends, there are the axial datum ring surface of mandrel, the radial datum cylindrical surface of mandrel, the locking thread of base-circle plate and the center holes of mandrel in sequence. The axial datum ring surface and the radial datum cylindrical surface of the mandrel are respectively axial datum and radial datum of the large gear involute artifact, which are also the axial datum and radial datum used to assemble the base-circle plates during machining and measurement based on the pure rolling generation principle. The two base-circle plates are fixed to the mandrel with the combination of a locking nut and a washer to realize the unification of the machining datum, the measurement datum and the using datum of the large gear involute artifact.

The backing plate has a rectangular structure and evenly distributed through holes for connecting the backing plate with the mandrel convincedly.

The counterweight shaft is T-shaped shaft with a screw holes, one end of which has the locking screw of artifact stripe. In order to increase the reliability of thread connection, the fine thread is used. Two parallel clamping surfaces for mounting are arranged at one end near the threaded holes on the adjustment datum surface for the counterweight shaft, which is convenient to connect the counterweight shaft and the large gear involute artifact stripe to the mandrel through the backing plate with the wrench. The other end of the counterweight shaft is provided with a shaft shoulder to prevent the adjustable counterweight ring moving out.

The adjustable counterweight ring is of ring structure, there are four symmetrical and adjustable screw holes of counterweight in the radial middle position for installing the setting screws for adjusting counterweight. The diameter of the inner hole of counterweight is larger than the diameter of the datum surface for adjusting counterweight by 1-2 mm. The radial and axial positions of the adjustable counterweight ring can be adjusted at the datum of the counterweight shaft to adjust the overall mass center of the large gear involute artifact through the mandrel axis, so as to realize the mass balance of the large gear involute artifact.

In order to reduce the influence of gravity on the tooth profile accuracy of large gear involute artifact, the mandrel axis of large gear involute artifact is placed along the vertical direction after assembly and the direction cannot be changed.

The beneficial effect of the invention is that it has invented a large gear involute artifact assembled with mandrel, the structure of artifact and the rolled length fit the basic requirements of Class-1 accuracy in the national standard of gear involute artifact GB/T 6467-2010 in China. It has advantages of long rolled length, adjustable center of mass, uniform datum, compact structure and portability. The gear profile slope deviation of the left and right flank of the large gear involute artifact can be compensated with an eccentric multi-ball bearing opened in patent (CN 201510560861.X) and by the compensate method opened in patent (CN 201510091994.7). The base-circle parameter can be adjusted by fine adjusting the distance between the flat grooves of mandrel in the mandrel connecting shaft section and the mandrel axis. It adopts lightweight design, which can be installed and transported by one person manually and is suitable for the structural design of large gear involute artifact with base-circle diameter greater than 500 mm.

BRIEF DESCRIPTIONS OF THE DRAWINGS

Figure 1:
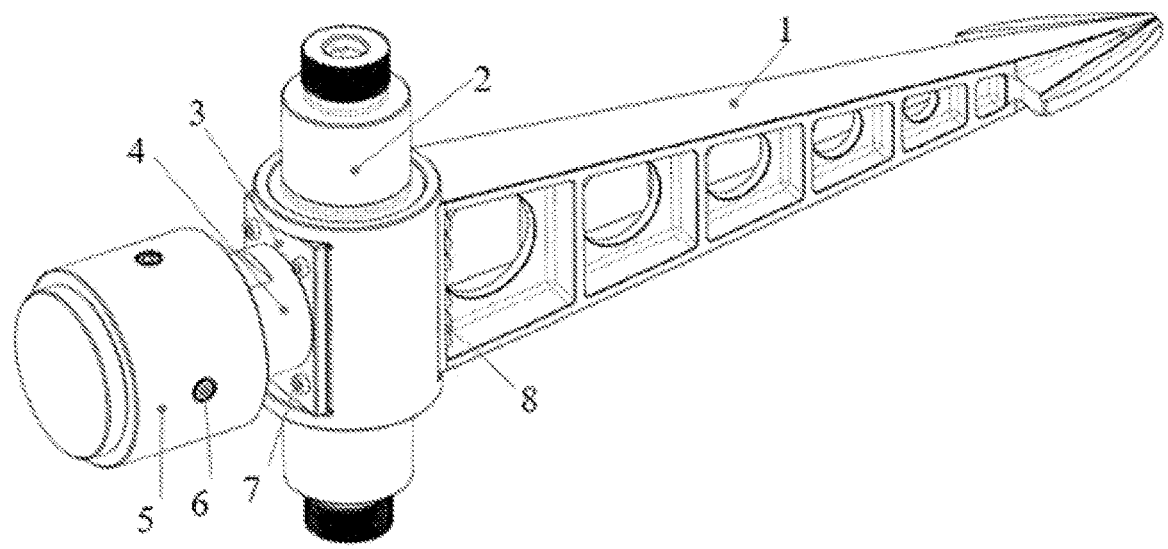
FIG. 1 illustrates a large gear involute artifact assembled with mandrel.
Figure 2:
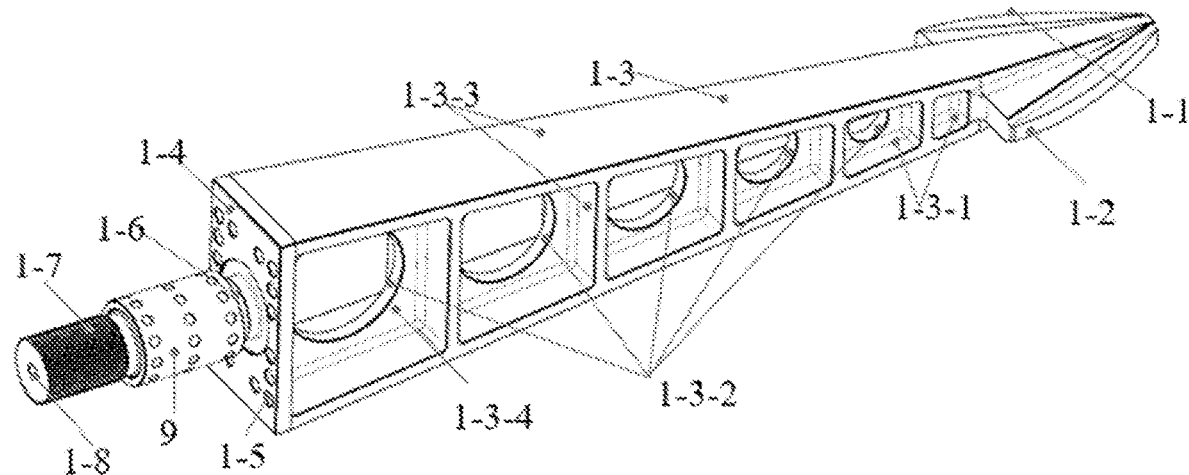
FIG. 2 illustrates a large gear involute artifact stripe and an eccentric multi-ball bearing.
Figure 3:
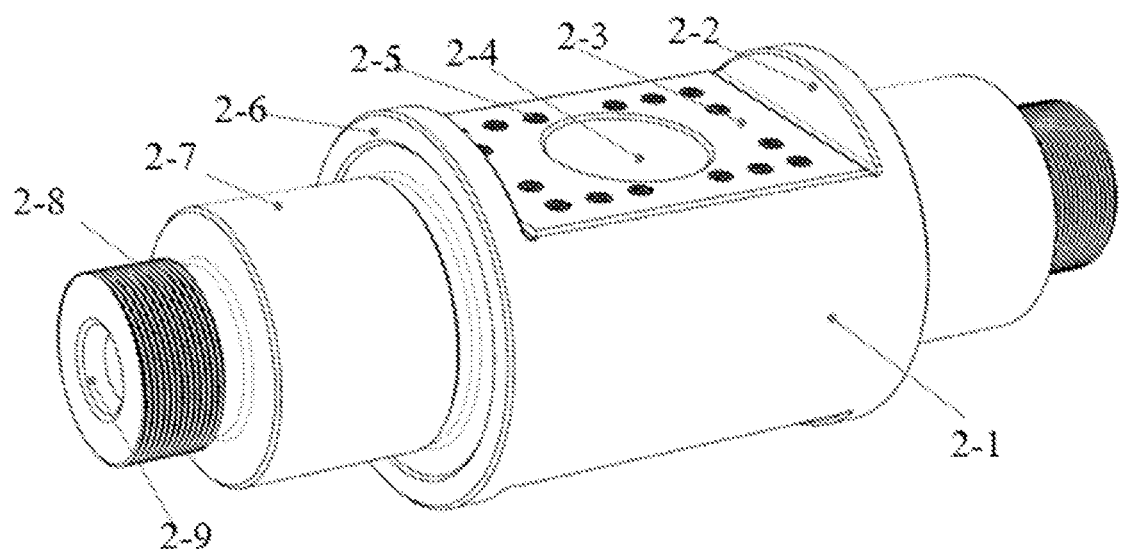
FIG. 3 illustrates a mandrel.
Figure 4:
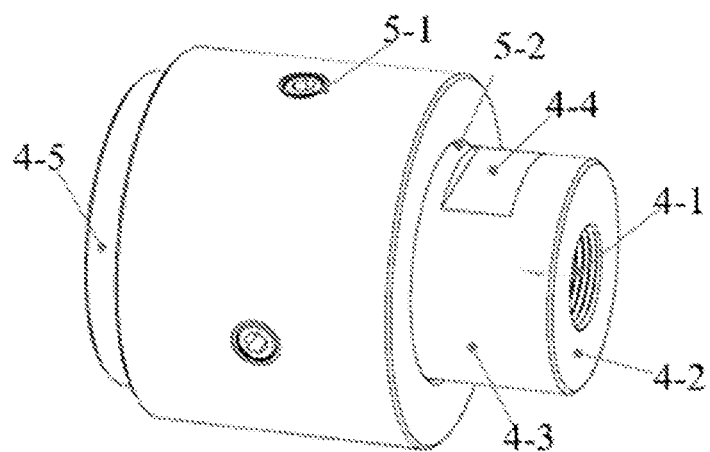
FIG. 4 illustrates a counterweight shaft and an adjustable counter weight ring.

wherein, 1 illustrates the large gear involute artifact stripe; 1-1 illustrates the left flank of gear involute artifact; 1-2 illustrates the right flank of gear involute artifact; 1-3 illustrates the support arm of artifact stripe; 1-3-1 illustrates the slot for reducing weight; 1-3-2 illustrates the holes for reducing weight; 1-3-3 illustrates the horizontal plate; 1-3-4 illustrates the web plate; 1-4 illustrates the connecter of artifact stripe; 1-5 illustrates the connecting holes of artifact stripe; 1-6 illustrates the radial datum shaft of artifact stripe; 1-7 illustrates the locking screw of artifact stripe; 1-8 illustrates the center holes of artifact stripe; 2 illustrates the mandrel; 2-1 illustrates the connecting shaft section of mandrel; 2-2 illustrates the flat grooves of mandrel; 2-3 illustrates the location surface of artifact; 2-4 illustrates the datum inner hole; 2-5 illustrates the connecting screw holes; 2-6 illustrates the axial datum ring surface of mandrel; 2-7 illustrates the radial datum cylindrical surface of mandrel; 2-8 illustrates the locking screw of base-circle plate; 2-9 illustrates the center holes of mandrel; 3 illustrates the backing plate; 4 illustrates the counterweight shaft; 4-1 illustrates the locking screw holes for artifact stripe; 4-2 illustrates the mounting surface of counterweight shaft; 4-3 illustrates the datum surface for adjusting counterweight; 4-4 illustrates the clamping surface for mounting; 4-5 illustrates the shaft shoulder; 5 illustrates the adjustable counterweight ring; 5-1 illustrates the adjustable screw holes of counterweight; 5-2 illustrates the inner hole of counterweight; 6 illustrates the setting screws for adjusting counterweight; 7 illustrates the connecting screws for backing plate; 8 illustrates the connecting screws for artifact; 9 illustrates the eccentric multi-ball bearing.

DETAILED DESCRIPTION

In the national standard of the gear involute artifact GB/T 6467-2010, the involute artifact with base-circle radius $r_b$ equal to 400 mm is the largest one, the recommended rolled length of it is 160 mm and the generating angle is 23°. Taking the large gear involute artifact with base-circle radius $r_b$ equal to 400 mm as an example, the detailed descriptions of a large gear involute artifact assembled with mandrel is illustrated as follows.

The large gear involute artifact stripe 1 is of integrated symmetrical structure, one end has artifact tooth, and the other end has the connecter 1-4, the radial datum shaft 1-6 and the locking screw 1-7 of artifact stripe for assembly, positioning and locking the artifact stripe, and the middle of artifact stripe is connected through the support arm 1-3 with the slot for reducing weight 1-3-1 and the holes for reducing weight 1-3-2. According to the working posture of the large gear involute artifact, the rectangular height of the design the connecter of artifact stripe 1-4 is greater than the rectangular width, to reduce the distortion and deformation of the artifact tooth under the weight of the large gear involute artifact. The height of the connecter of artifact stripe 1-4 is designed to 100 mm, which is smaller than the flat grooves of mandrel 2-2 at 0~0.01 mm by tolerance controlling, and the width is 60 mm.

Artifact tooth comprise a left flank of gear involute artifact 1-1 and a right flank of gear involute artifact 1-2 which are axial symmetry along with the radial datum shaft of artifact stripe 1-6. The face width of artifact tooth is 8 mm, the tip circle diameter is 980 mm, the rolled length is designed to 283 mm, the evaluation rang of gear profile form deviation and gear slope deviation is [10 mm, 280 mm], then the effective rolled length is 270 mm, which is 110 mm longer than the recommended rolled length of the gear involute artifact in the national standard, and meets the requirements of the Class-1 accuracy for the rolled length, and the designed gear profile is given from the base circle. In order not to increase the weight of the large gear involute artifact and reduce the deflection and deformation under the self-weight of the artifact tooth on accuracy of the left flank 1-1 and the right flank 1-2 of the large gear involute artifact, the two flanks of the large gear involute artifact should be as close as possible. The central angle corresponding to the starting point on the base circle of the left tooth flank of the gear involute artifact 1-1 and the right tooth flank of the involute artifact 1-2 is designed to 12°. The two ends of the large gear involute artifact 1 are provided with central holes 1-8, which is convenient for machining the connecter 1-4, the radial datum shaft 1-6 and the locking screw 1-7 of the large gear involute artifact stripe. Under the condition of ensuring the structural rigidity of the large gear involute artifact strip 1, the mass of the large gear involute artifact strip 1 should be reduced as much as possible. The support arm of artifact stripe 1-3 adopt a tapered web plate structure with gradually reduced sections. The thickness of the connecter of artifact stripe 1-4 and the web plate 1-3-4 with holes for reducing weight is 8 mm, and the thickness of the other horizontal plates 1-3-3 is 6 mm. The large gear involute artifact strip 1 is multiple fixedly connected to the mandrel 1-2 with the backing plate 3, the counterweight shaft 4, the connecting screws for backing plate 7, the connecting screws for artifact, to ensure the rigidity and stability of the connection between the large gear involute artifact strip 1 and the mandrel 2.

The material of the large gear involute artifact stripe 1 is GCr15, and the hardness of the left tooth flank of the gear involute artifact 1-1 and the right tooth flank of the gear involute artifact 1-2 is not less than HRC60 by quenching and refrigerating with liquid nitrogen cryogenic.

The mandrel 2 is the datum shaft for machining and measurement of the large gear involute artifact, which is of symmetrical structure at both ends. The total length of the mandrel is 280 mm, the diameter of the connecting shaft section 2-1 is 98 mm and the length of it is 120 mm. The two parallel the flat grooves 2-2 of mandrel are machined symmetrically relative to the mandrel axis, the height of the flat grooves of mandrel 2-2 is 100 mm, and the depth is 15 mm. The height of the flat grooves of mandrel 2-2 is a little larger than the large gear involute artifact stripe 1 and the backing plate 3 at 0~0.01 mm by tolerance controlling, which is used to limit the rotational freedom of the large gear involute artifact stripe 1 and the backing plate 3 relative to the mandrel 2 after assembly. The middle of flat grooves of mandrel has a datum inner hole 2-4 whose centerline is orthogonal to mandrel axis, and used as the assembly datum of the large gear involute artifact stripe 1 as well as the plane of the flat grooves of mandrel 2-2. The diameter of the inner hole of the flat grooves of mandrel 2-2 should be determined according to the diameter of the radial datum shaft of artifact stripe 1-6 of the artifact and the diameter of the steel ball used in the eccentric multi-ball bearing 9. Taking the design requirements for rigidity and light weight of the mandrel 2 into account, the diameter of the inner hole of the mandrel 2 is designed to 40 mm, the diameter of the steel ball in eccentric multi-ball bearing is about 5.00 mm, the size of the radial datum shaft of artifact stripe 1-6 of the artifact strip is 30 mm, and the eccentric multi-ball bearing 9 is ensured the single-sided interference between the steel ball and the large gear involute artifact strip 1 and the mandrel 2 is between 1 μm and 3 μm.

The flat grooves of mandrel 2-2 is provided with rectangular close-packed locking and connecting screw holes 2-5 of the artifact strip. According to the flat grooves of mandrel 2-2, rectangular array of 16 M6 connecting the connecting screw holes 2-5 are set on the connecter of artifact stripe 1-4, corresponding to the connecting holes of artifact stripe 1-5 on the connecter of artifact stripe 1-4, which are used to connect the large gear involute artifact strip 1 and the backing plate 3. The two location surfaces of artifacts 2-3 in the flat grooves of mandrel 2-2 have higher requirements of flatness, parallelism and symmetry.

From the connecting shaft section of mandrel 2 to the two ends, there are the axial datum ring surface of mandrel 2-6, the radial datum cylindrical surface of mandrel 2-7, the locking screw of base-circle plate 2-8 and the center holes of mandrel 2-9 in sequence. The diameter of the radial datum cylindrical surface of mandrel 2-7 of the mandrel is 66 mm, and the roundness error relative to the center holes of mandrel 2-9 of the mandrel is not more than 1 μm, the end jump error of the axial datum ring surface of mandrel 2-6 relative to the center holes of mandrel 2-9 is not more than 1 μm. The axial datum ring surface 2-6 and the radial datum cylindrical surface 2-7 of the mandrel are respectively axial datum and radial datum of the large gear involute artifact, which are also the axial datum and radial datum used to assemble the base-circle plates during machining and measurement based on the pure rolling generation principle. The two base-circle plates are fixed to the mandrel with the combination of a locking nut and a washer to realize the unification of the machining datum, the measurement datum and the using datum of the large gear involute artifact. The machining accuracy of datum surfaces of the mandrel can be improved by precision grinding process.

The backing plate 3 has a rectangular structure and four evenly distributed through holes for connecting the backing plate 3 with the mandrel 2 convincedly.

The counterweight shaft 4 is a T-shaped shaft with a screw hole, one end of it has a locking screw hole for artifact stripe 4-1. The dimeter of the datum surface for adjusting counterweight 4-3 is 66 mm, the total length of it is 127 mm, and the diameter of the shaft shoulder 4-5 is 90 mm. The parameters of the locking screw holes for artifact stripe 4-1 are M30 with pitch 1.5 mm, and the depth of the screw hole is 30 mm. The datum surface for adjusting counterweight 4-3 is close to the locking screw holes for artifact stripe 4-1. Two parallel clamping surfaces for mounting 4-4 are arranged at one end near the locking screw hole for artifact stripe 4-1 on the adjustment datum surface for the counterweight shaft 4-3, which is convenient to connect the counterweight shaft 4 and the large gear involute artifact stripe 1 to the mandrel 2 through the backing plate 3 with the wrench. The other end of the counterweight shaft is provided with a shaft shoulder 4-5 to prevent the adjustable counterweight ring 5 moving out.

The adjustable counterweight ring 5 has a ring structure, which the inner diameter is 67 mm, the outer diameter is 106 mm, and a length of it is 80 mm. There are four symmetrical the adjustable screw holes of counterweight 5-1 in the radial middle position for installing the setting screws for adjusting counterweight 6, the parameters of M12 with pitch 1.5 mm, flat head and fine pitch hexagon socket set screws can be used.

By the three-dimensional model verification, when the adjustable counterweight ring 5 moves to about 1 mm away from shaft shoulder 4-5 of the counterweight shaft, the theoretical center of mass point of the whole large gear involute artifact passes through the axis of the mandrel 2, for the adjustable counterweight ring 5 has an axial adjustment space after assembly in practice.

Due to the influence of factors such as machining accuracy, density uniformity, assembly error and other factors in all the parts of the large gear involute artifact assembled with mandrel, the large gear involute artifact needs to be precisely and statically balanced based on the center holes of the mandrel 2-9 or the radial datum surface 2-7 of the mandrel after assembly. By Adjusting the radial and axial positions of the adjustable counterweight ring 5 on the counterweight shaft 4 to adjust the overall center of mass of the large gear involute artifact through the axis of the mandrel, so as to realize the mass balance of the large gear involute artifact.

Before assembling the large gear involute artifact and the finishing of the left and right gear flanks, all the parts should be fully aging treated. Before finishing the left and right gear flank, the assembly of the large gear involute artifact is carried out by choosing non-eccentric multi-ball bearing, after finishing, according to the difference of the tooth profile slope deviations of the left and right tooth and the convex and concave error of the tooth profile form deviation can be compensated with the special eccentric multi-ball bearing 9. After compensation, a torque wrench is used to evenly fixed the connecting screws for artifact 8, the connecting screws for backing plate 7 and the counterweight shaft 4 to the mandrel 2. And then the center of mass of the large gear involute artifact through the axis of the mandrel 2 is adjusted by precisely and statically balancing.

The large gear involute artifact with a base-circle radius $r_b$ equal to 400 mm provided in the above detailed descriptions has an overall weight of about 20 kg which can be carried by a single person manually. In order to reduce the influence of gravity on the accuracy of the tooth profile of the large gear involute artifact, the axis of the mandrel of the large gear involute artifact is placed at the vertical direction after assembly and the direction cannot be changed.

The above descriptions only express the implements of the invention, but cannot be understood as limiting the scope of the patent of the invention. It should be noted that for those skilled in the art, several modifications and improvements can be made without departing from the concept of the invention, which belong to the protection scope of the invention.

The invention claimed is:

1. A large gear involute artifact assembled with mandrel, comprising: a large gear involute artifact stripe (1), a mandrel (2), a backing plate (3), a counterweight shaft (4), an adjustable counterweight ring (5), the setting screws for adjusting counterweight (6), the connecting screws for backing plate (7), the connecting screws for artifact and an eccentric multi-ball bearing (9);

the large gear involute artifact stripe (1) is of integrated symmetrical structure, one end has the artifact tooth, and the other end have the connecter (1-4) of artifact stripe used for installing, positioning and locking, the radial datum shaft of artifact stripe (1-6) and the locking screws of artifact stripe (1-7); the middle of the two ends is connected with the support arm of artifact stripe (1-3); the artifact tooth comprise a left flank of gear involute artifact (1-1) and a right flank of gear involute artifact (1-2) of shaft which are axial symmetry along with the radial datum shaft of artifact stripe (1-6); the large gear involute artifact stripe (1) fixedly connected to the mandrel (2) with the backing plate (3), the counterweight shaft (4), the connecting screws for backing plate (7), and the connecting screws for artifact (8);

the mandrel (2) is the machining and measurement datum shaft of the large gear involute artifact, which is of symmetrical structure at both ends; the two parallel flat grooves (2-2) in the connecting shaft section of mandrel (2-1) are machined symmetrically relative to the mandrel axis; the middle of flat grooves of mandrel (2-1) has a datum inner hole (2-4) whose centerline is orthogonal to mandrel axis, and used as the assembly datum of the large gear involute artifact stripe together with the flat grooves of mandrel of surface; the flat grooves of mandrel (2-2) have the close-packed locking screw holes of artifact stripe for connecting with the large gear involute artifact stripe (1) and the backing plate (3); from the connecting shaft section of mandrel to the two ends, there are the axial datum ring surface (2-6), the radial datum cylindrical surface (2-7), the locking screws of base-circle plate (2-8) and the center holes (2-9) of mandrel in sequence; the axial datum ring surface (2-6) and the radial datum cylindrical surface (2-7) of the mandrel are axial datum and radial datum of the large gear involute artifact respectively.

2. The large gear involute artifact assembled with mandrel according to claim 1, wherein the backing plate (3) has a rectangular structure and evenly distributed through holes for connecting the backing plate (3) with the mandrel (2) convincedly.

3. The large gear involute artifact assembled with mandrel according to claim 1, wherein the counterweight shaft (4) is T-shaft with a screws hole, one end of it has a locking screws hole for artifact stripe (4-1); in order to increase the reliability of thread connection, the fine thread is used; two parallel clamping surfaces (4-4) for mounting are arranged at one end near the threaded hole on the adjustment datum surface (4-3) for the counterweight shaft, which is convenient to connect the counterweight shaft and the large gear involute artifact stripe to the mandrel (2) through the backing plate (3) with the wrench; the other end of the counterweight shaft is provided with a shaft shoulder to prevent the adjustable counterweight ring (5) moving out.

4. The large gear involute artifact assembled with mandrel according to claim 1, wherein the adjustable counterweight ring (5) is of ring structure, there are four symmetrical the adjustable screw holes of counterweight (5-1) in the radial middle position for installing the setting screws for adjusting counterweight (5-2); the diameter of the inner hole of counterweight is larger than that of the datum surface for adjusting counterweight (4-3) by 1~2 mm; the radial and axial positions of the adjustable counterweight ring (5) can be adjusted at the datum of the counterweight shaft (4) to adjust the overall mass center of the large gear involute artifact through the mandrel axis, so as to realize the mass balance of the large gear involute artifact.

5. The large gear involute artifact assembled with mandrel according to claim 1, wherein the slot for reducing weight (1-3-1) and the hole for reducing weight (1-3-2) are arranged on the support arm of artifact stripe (1-3).

6. The large gear involute artifact assembled with mandrel according to claim 1, wherein the face width of artifact tooth is not smaller than 6 mm and the rolled length of the involute is not smaller than the recommended value in national standard of gear involute artifact GB/T 6467-2010 in China.

7. The large gear involute artifact assembled with mandrel according to claim 1, wherein the two ends of the large gear involute artifact stripe (1) have center holes, which is convenient for machining the connecting plate mounting surface, the radial datum shaft and the locking screws of the large gear involute artifact stripe.

8. The large gear involute artifact assembled with mandrel according to claim 1, wherein the height of the flat grooves of mandrel (2-2) is higher than that of the connecting plate and the backing plate to limit rotational freedom of the large gear involute artifact stripe and the backing plate relative to the mandrel after assembly.

9. The large gear involute artifact assembled with mandrel according to claim 1, wherein the axial datum ring surface (2-6) and the radial datum cylindrical surface (2-7) of the mandrel are axial datum and radial datum of the large gear involute artifact respectively when used to install the base-circle plates during machining and measurement based on the pure rolling generation principle; the two base-circle plates are fixed to the mandrel with the combination of a locking nut and a washer to realize the unification of the machining datum, the measurement datum and the using datum of the large gear involute artifact.

10. The large gear involute artifact assembled with mandrel according to claim 1, wherein the mandrel axis of large gear involute artifact is placed along the vertical direction after assembly and the direction cannot be changed.

* * * * *